United States Patent [19]
Ju et al.

[11] Patent Number: 5,845,126
[45] Date of Patent: Dec. 1, 1998

[54] METHOD OF, SYSTEM FOR, AND COMPUTER PROGRAM PRODUCT FOR PROVIDING INLINED NESTED ARRAY CONSTRUCTORS USING NORMALIZED COUNTERS

[75] Inventors: Dz Ching Ju, Sunnyvale; John Shek-Luen Ng, San Jose, both of Calif.

[73] Assignee: International Business Machines Corporation, Armonk, N.Y.

[21] Appl. No.: 570,173

[22] Filed: Dec. 6, 1995

[51] Int. Cl.$^6$ ................................................. G06F 9/45
[52] U.S. Cl. ............................................ 395/708; 395/705
[58] Field of Search ................................... 395/705, 706, 395/707, 708

[56] References Cited

U.S. PATENT DOCUMENTS

| | | | |
|---|---|---|---|
| 5,175,856 | 12/1992 | Van Dyke et al. | 395/700 |
| 5,200,915 | 4/1993 | Hayami et al. | 364/736.03 |
| 5,274,818 | 12/1993 | Vasilevsky et al. | 395/705 |
| 5,276,881 | 1/1994 | Chan et al. | 395/700 |
| 5,280,613 | 1/1994 | Chan et al. | 395/700 |
| 5,339,419 | 8/1994 | Chan et al. | 395/700 |
| 5,375,242 | 12/1994 | Kumar et al. | 395/700 |
| 5,485,619 | 1/1996 | Lai et al. | 395/706 |
| 5,640,568 | 6/1997 | Komatsu | 395/705 |

OTHER PUBLICATIONS

Aho, et al., "Compilers Principles, Techniques, and Tools," Addison–Wesley, pp. 36–37, 316–319, 345–347, and 660–664, 1988.

Ju, et al., "The classification, fusion, and parallelization of array language primitives," IEEE, IEEE Trans. on Para. and Dist. Systs., vol. 5, iss 10, pp. 1113–1120, Oct. 1994.

Bozkus, et al., "Compiling distribution directives in a Fortran 90D compiler," IEEE, Proc. of 5th IEEE Symp. on Para. & Dist. Proc., pp. 617–620, Dec. 4, 1993.

Bozkus, et al., "Scalable libraries for Fortran 90D/High Performance Fortran," IEEE, Proc. of Scalable Para. Lib. Conf., pp. 67–76, Oct. 8, 1993.

Thakur, et al., "Runtime array redistribution in HPF programs," IEEE, Proc. of Scalable HP Comp. Conf., pp. 309–316, May 25, 1994.

Albert, et al., "Data parallel computers and the FORALL statement," IEEE, 3rd Symp. on Front. of Massively Para. Comp., pp. 390–396, Oct. 10, 1990.

Choudhary, et al., "Compiling Fortran 77D and 90D for MIMD distributed–memory machines," IEEE, 4th Symp. on the Frontiers of Massively Para. Comp., pp. 4–11, Oct. 21, 1992.

Albert, et al., "Data Parallel Computers and the FORALL Statement," Journal of Parallel and Distributed Computing, vol. 13, No. 2, pp. 185–192, Oct. 1991.

Gao, et al., "A Strict Monolithic Array Constructor," Proc. of 2nd IEEE Symp. on Parallel and Dist. Proc., pp. 596–603, Dec. 13, 1990.

Choudhary, et al., "Unified Compilation of Fortran 77D and 90D," ACM Letters on Prog. Langs. and Sys., vol. 2, No. 1–4, pp. 95–114, Dec. 1993.

"Data Parallel Computers and the FORALL Statement", Albert, Eugene; Lukas, Joan D.; Steele, Guy L., Jr., *Journal of Parallel and Distributed Computing*, vol. 13, No. 2, Oct. 1991, pp. 185–192.

(List continued on next page.)

*Primary Examiner*—James P. Trammell
*Assistant Examiner*—Peter J. Corcoran, III
*Attorney, Agent, or Firm*—Prentiss W. Johnson

[57] ABSTRACT

Method of, system for, and computer program product for generating efficient code for a set of nested Fortran 90 array constructors without introducing temporary vectors by the use of normalized counters and by maintaining array constructor extent structure trees. Non-perfectly nested array constructors and array constructors with dynamic extents may be inlined. The results provided include a reduction in run-time memory storage usage and an improvement in execution time performance.

12 Claims, 7 Drawing Sheets

OTHER PUBLICATIONS

"Unified Compilation of Fortran 77D and 90D" Choudhary, Alok; Gox, Geoffrey; Hiranandani, Seema, *ACM Letters on Programming Languages and Systems,* vol. 2, No. 1–4, Mar.–Dec., 1993, pp. 95–114.

"International Fortran Standard" ISO/IEC 1539:1991.

A Strict Monolithic Array Constructor:, Gao, Guang R.; Yates, Robert, Kim; Dennis, Jack B.; Mullin, Lenore M. R., *Proceeding of the Second IEEE Symposium on Parallel and Distributed Processing,* pp. 596–603, 1990.

METHOD OF, SYSTEM FOR, AND COMPUTER PROGRAM PRODUCT FOR PROVIDING INLINED NESTED ARRAY CONSTRUCTORS USING NORMALIZED COUNTERS

A portion of the Disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

This invention relates generally to optimizing compilers for development of computer programs for use on a computer, and more particularly to generating efficient code for array constructors.

2. Description of the Related Art

Recently, the X3J3 subcommittee of the American and National Standards Institute (ANSI), in collaboration with a corresponding International Standards Organization (ISO) group ISO/IEC JTC1/SC22/WG5, approved a new standard for the Fortran programming language. This new Fortran programming language standard is generally denominated the "Fortran 90" language standard and is also in the art denominated the "Fortran 90 Array" language standard. While maintaining compatibility with and providing support for the previous "FORTRAN 77" language standard, this new Fortran 90 Array language standard defines many new programming constructs and functions.

Among these new features are the "array language" protocols. Fortran programs in the Fortran 90 language may specify operations to be performed on entire arrays or on specific sections of arrays. To facilitate the construction of these arrays and these new array operations, the Fortran 90 standard defines a new class of array functions denominated "array constructors". The Fortran 90 standard is promulgated by the ISO as the International Fortran Standard specification number ISO/IEC 1539:1991 and is promulgated by the ANSI as specification number ANSI X3.198-199x.

The new features promulgated in the Fortran 90 language standard create new challenges for existing Fortran compiler and preprocessor technology. The existing FORTRAN 77 compilers do not address the array constructor functions and must be completely rewritten and restructured to accommodate the Fortran 90 standard. The new problems created by Fortran 90 array constructors can be appreciated with reference to the FORTRAN compiler art.

FIG. 1 illustrates a procedure for translating a FORTRAN program 10 to create an executable binary object program 12. A lexical/syntax analysis 14 is conducted to transform source program 10 to a first intermediate language program 16. First intermediate language program 16 is then processed by an optimization routine 18 to create a second intermediate language program 20, which is then directly interpreted by the code generation routine 22 to create object program 12.

Lexical/syntax analysis routine 14 and code generation routine 22 are easily defined in terms of the Fortran 90 specification and the machine binary code set, respectively. Thus, it is optimization routine 18 that is primarily affected by the new Fortran 90 standard. Optimization routine 18 is illustrated in FIG. 2 as it is understood in the art. Optimization processing is achieved by first performing a control flow analysis in routine 24 of first intermediate language 16. Control flow analysis routine 24 provides the control flow data 26, which are then passed to a data-flow analysis routine 28 wherein first intermediate language program 16 is analyzed for data flow. Data-flow analysis routine 28 produces the data-flow data 30. Finally, a program transformation procedure 32 accepts control flow data 26, data-flow data 30, and first intermediate language program 16 to produce second intermediate language program 20.

Many methods for constructing arrays are known in the art. For instance, in U.S. Pat. No. 5,200,915, Ken Hayami et al. disclose a device for solving a symmetric linear system that is capable of carrying out vector processing at a high speed. Hayami et al. teach the use of an array construction section 11 which uses a temporary workspace array IL to construct a pointer array JL in a set of nested DO-loops. The objects of this device are high speed and a smaller memory area. Hayami et al. suggest the use of such temporary arrays provides high speed and a smaller memory area.

Similarly, Albert et al. (Eugene Albert, Joan D. Lukas, and Guy L. Steele, Jr., "Data Parallel Computers and the FORALL Statement", Journal of Parallel and Distributed Computing, vol. 13, no. 2, October 1991, p. 185–192) disclose compiling methods for Fortran 90 array constructors and FORALL statements. The FORALL statement is an element array assignment statement used to specify an array assignment in terms of individual elements or sections. Albert et al. teach that a FORALL statement is semantically equivalent to a pair of nested DO loops wherein the first DO loop evaluates the right hand side of the FORALL into a temporary array, and wherein the second DO loop assigns the temporary array to the left hand side of the FORALL. Although Albert et al. teach that the temporary array is not needed when there are no order dependencies, Albert et al. suggests that the temporary array is needed when there are order dependencies.

Choudhary et al. (Alok Choudhary, Geoffrey Fox, and Seema Hiranandani, "Unified Compilation of Fortran 77D and 90D", ACM Letters on Programmning Languages and Systems, vol. 2, no. 1–4, March–December, 1993, p. 95–114) also disclose compiling methods for Fortran 90 array constructors, FORALL statements, and WHERE statements. Choudhary et al. also teach assigning the results of right hand side evaluations to temporary arrays before storing the results to left hand sides. Choudhary et al. recognize that the use of such temporary arrays is a problem, and suggest loop reversal and data prefetching as partial solutions for some, but not all, situations.

Similarly, Gao et al. (Guang R. Gao, Robert Kim Yates, Jack B. Dennis, and Lenore M. R. Mullin, "A Strict Monolithic Array Constructor", Proceeding of the Second IEEE Symposium on Parallel and Distributed Processing, p. 596–603, 1990.) recognize that the use of such temporary arrays is a problem. Gao et al. suggest extending the semantics of an array constructor statement to allow a programmer to specify an evaluation order of the array constructor. If the programmer knows an evaluation order which does not need temporary arrays, then the programmer may avoid the use of temporary arrays. However, if the programmer does not know such an evaluation order, then temporary arrays may be used. This suggested partial solution effectively moves the program optimization from the compiler to the mind of the programmer.

Thus, practitioners in the art generally employ temporary arrays during the construction of arrays. Despite extensive effort in the compiler art related to array construction and optimization, the array constructor functions introduced by the new Fortran 90 standard bring with them new inefficiencies in storage and processing and there is an accordingly clearly-felt need in the art for more efficient compiling procedures suitable for application to these new Fortran 90 array constructor functions.

This problem can be better understood by considering an example. The Fortran 90 standard specification defines an array constructor (ac) as a sequence of specified scalar values and is interpreted as a rank-one array whose element values are those specified in the sequence. An array constructor has the following syntax:

| | |
|---|---|
| array-constructor: | (/ac-value-list/) |
| ac-value-list: | ac-value-list, ac-value |
| ac-value: | expr or ac-implied-do |
| ac-implied-do: | (ac-value-list, ac-implied-do-control) |
| ac-implied-do-control: | ac-do-variable = scalar-int-expr, scalar-int-expr {, scalar-int-expr} |
| ac-do-variable: | scalar-int-variable |

An example of an array constructor is X=(/3.2, 4.01, 6.5/) which constructs the following array: X=[3.2 4.01 6.5].

Another example of an array constructor is Y=(/(1.0*I, I=1,99),X/) which constructs the following array: Y=[1 2 3 . . . 98 99 3.2 4.01 6.5].

Generation of efficient code by a compiler for an expression containing an array constructor is non-trivial because of the combination of various complicated expressions in ac-value-lists.

The following example of Table A may be used to show the varying effectiveness of different approaches for processing array constructors to generate code:

TABLE A a(2:12:2) = d(1:16:3)+(/20.0,c(2:8:3)+(/0.0,b(3:4)/),(10.0*i,i=2,3)/)

The array constructor of Table A generates the following array of Table B:

TABLE B a = [20.0+d(1) c(2)+d(4) b(3)+c(5)+d(7) b(4)+c(8)+d(10) 20.0+d(13) 30.0+d(16)]

A straight-forward approach to process array constructors according to conventional teachings is to split every array constructor and implied-do, and to create a temporary vector. This approach generates the following code of Table C:

TABLE C

```
j1 = 1
r1(j1) = 0.0
do i1 = 1,2
   j1 = j1 + 1
   r1(j1) = b(i1+2)
enddo
j2 = 0
do i = 2,3
   j2 = j2 + 1
   r2(j2) = 10.0 * i
enddo
j3 = 1
r3(j3) = 20.0
```

TABLE C-continued

```
do i3 = 1,3
   j3 = j3 + 1
   r3(j3) = c(3*i3-1) + r1(i3)
enddo
do i3 = 1,3
   j3 = j3 + 1
   r3(j3) = r2(i3)
enddo
do i4 = 1,6
   a(2*i4) = d(3*i4-2) + r3(i4)
enddo
```

The main disadvantage of this straight forward approach is the excessive use of temporary storage. In the example of Table C, three temporary vectors are created: r1 with 2 elements, r2 with 3 elements, and r3 with 6 elements. In an application with large sets of data, the excessive temporary vectors may deteriorate memory locality, which in turn may degrade execution time performance.

Another approach is the single index variable approach which splits non-perfectly nested array constructors. This single index variable approach may use less temporary storage. The following code of Table D is generated from the preprocessor with unrelated optimizations removed for clarity:

TABLE D

```
j2 = 0
j2 = j2 + 1
r1(j2) = 0.0
do i2 = 1,2
   j2 = j2 + 1
   r1(j2) = b(i2+2)
enddo
j3 = 0
j3 = j3 + 1
r2(j3) = 20.0
do i3 = 1,2
   j3 = j3 + 1
   r2(j3) = c(2) + r1(1)
enddo
do i = 2,3
   j3 = j3 + 1
   r2(j3) = 10.0*i;
enddo
do j1 = 1, 6
   a(j1*2) = d(j1*3-2) + r2(j1)
end do
```

The single index variable approach reduces the number of temporary vectors from three to two: r1 with 3 elements and r2 with 6 elements. However, this approach can only inline perfectly nested array constructors, in which each ac-value can only be an array constructor, implied-do, or an expression containing no array constructors. In this example, the array constructor in c(2:8:3)+(/0.0,b(3:4)/), is not perfectly nested.

These conventional approaches are unable to inline non-perfectly nested array constructors. These conventional approaches also have difficulties generating correct code for array constructors with dynamic extents.

In view of the above performance, efficiency, and functional deficiencies of traditional systems, there is a need for a method of, system for, and computer program product for generating efficient code for a set of nested Fortran 90 array constructors.

SUMMARY OF THE INVENTION

The invention disclosed herein comprises a method of, system for, and computer program product for generating efficient code for a set of nested Fortran 90 array constructors without introducing temporary vectors by the use of normalized counters and by maintaining array constructor extent structure trees. The results of this new array constructor process are a considerable reduction in run-time memory storage usage and an improvement in execution time performance.

Although the example of Table A contains non-perfectly nested array constructors, a compiler using the present invention can generate the following efficient code of Table E with all temporary vectors removed:

TABLE E

```
nc1 = 1
a(2*nc1) = d(3*nc1-2) + 20.0
nc1 = nc1+1
nc2 = 1
a(2*nc1) = d(3*nc1-2) + c(3*nc2-1) + 0.0
do j = 1,2
   nc1 = nc1+1
   nc2 = nc2 + 1
   a(2*nc1=d(3*nc1-2)+c(3*nc2-1)+b(j+2)
enddo
do I = 2,3
   nc1 = nc1+1
   a(2*nc1) = d(3*nc1-2) + 10.0*I
enddo
```

This resultant code removes temporary vectors and improves memory locality, which may lead to better execution time performance.

In accordance with one aspect of the present invention, a normalized counter is used at each level of array constructors (ACs) while scalarizing an expression containing array constructors.

In accordance with another aspect of the present invention, array constructor extent structures are maintained while scalarizing an expression containing array constructors.

The present invention has the advantage of generating efficient code for nested Fortran 90 array constructors by avoiding temporary vectors.

The present invention has the advantage of reducing the amount of run-time storage required to generate code for nested Fortran 90 array constructors.

The present invention has the advantage of reducing the amount of execution time storage required to generate code for nested Fortran 90 array constructors.

The present invention has the advantage of providing improved memory locality in the generation of code for nested Fortran 90 array constructors.

The present invention has the advantage of generating in-lined code for non-perfectly nested Fortran 90 array constructors.

The present invention has the advantage of generating in-lined code for Fortran 90 array constructors with dynamic extents.

DESCRIPTION OF TEE DRAWINGS

For a more complete understanding of the present invention and the advantages thereof, reference is now made to the Detailed Description in conjunction with the attached Drawings, in which.

Figure 6:
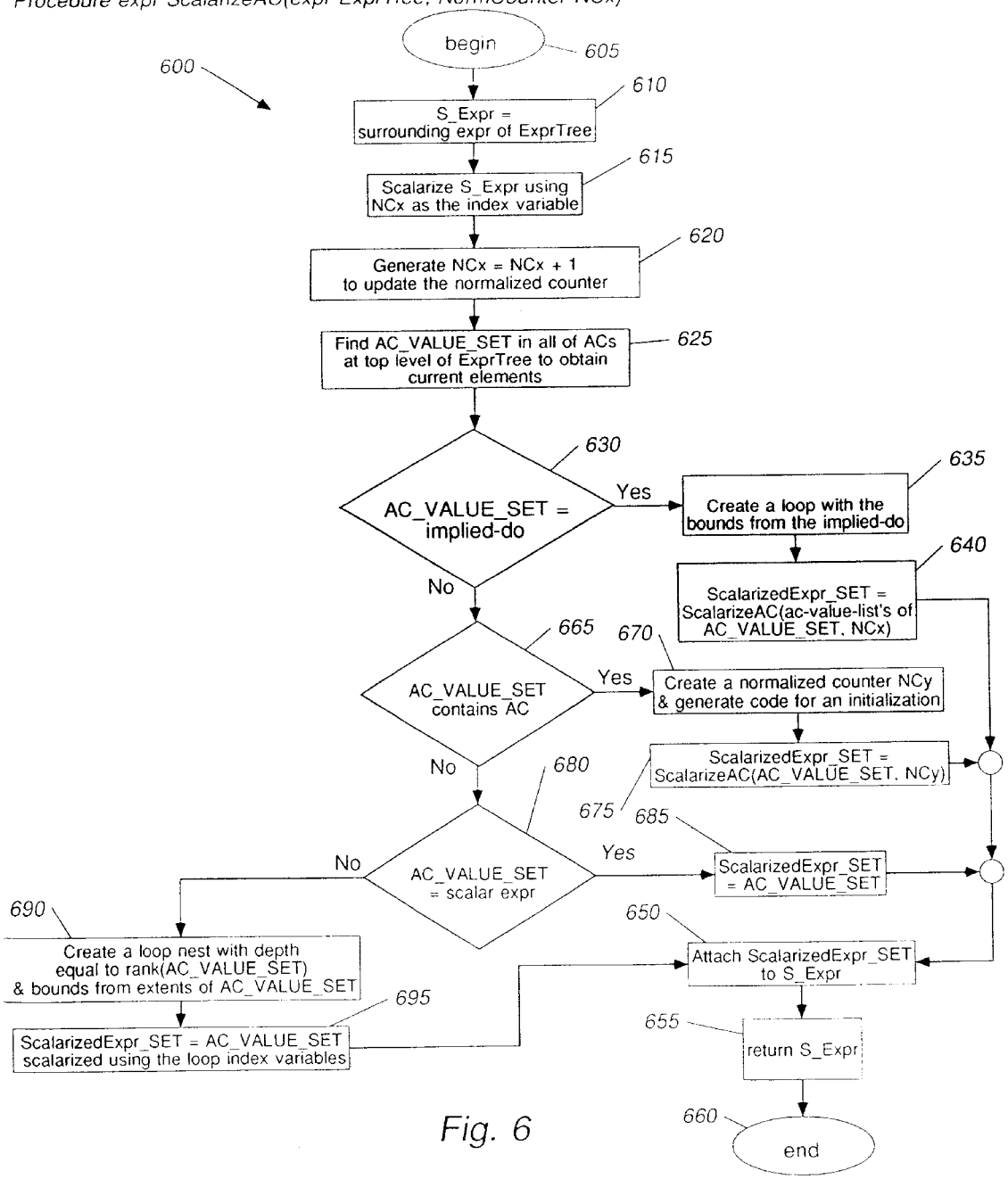
Figure 7:
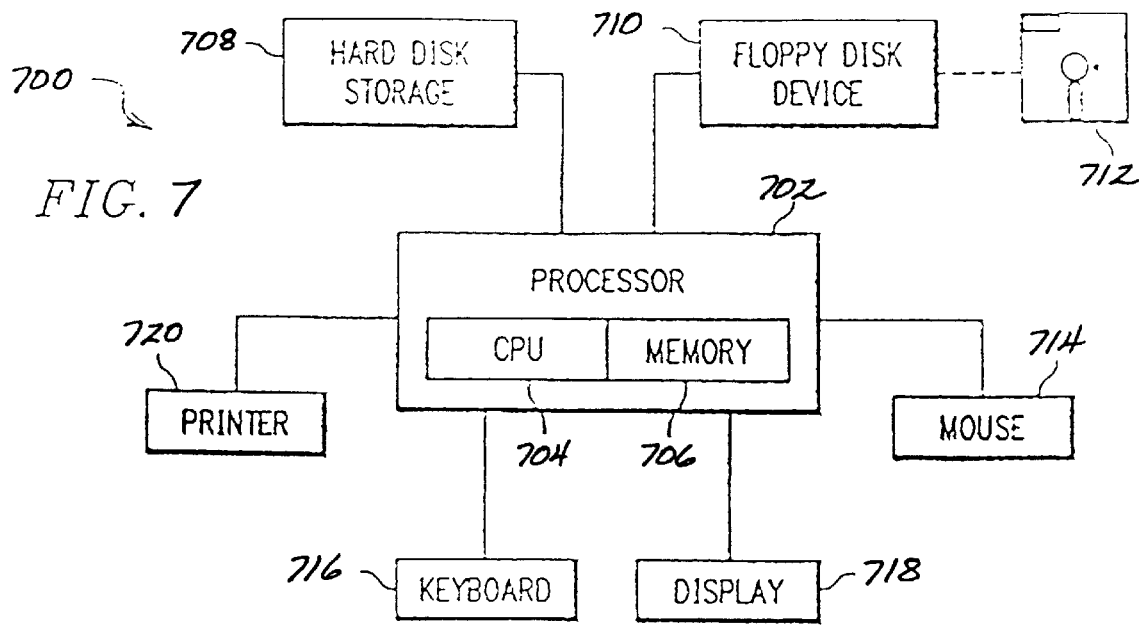

FIG. 6 is a flowchart illustrating the operations preferred in carrying out the Procedure ScarlarAC portion of the present invention; and FIG. 7 is a block diagram of a computer system used in performing the method of the present invention, forming part of the apparatus of the present invention, and which may use the article of manufacture comprising a computer-readable storage medium having a computer program embodied in said medium which may cause the computer system to practice the present invention.

DESCRIPTION OF THE PREFERRED EMBODIMENT

The key element of this invention is to apply a normalized counter at each level of array constructors (ACs) while scalarizing an expression containing array constructors. Two array constructors are said to be at the same level if they share the same nearest ac-value ancestor. For example, in (/ . . . , (/c(1),c(5:8:3)/)+(/0.0,b(3:4)/), . . . /), the two array constructors, (/c(1),c(5:8:3)/) and (/0.0,b(3:4)/), are at the same level.

Some terminology is defined before further description. An "elemental operator" is such that each element of the target array is obtained as the operator applied to the corresponding element or pair of elements of the source. Examples of elemental operators are +, *, and SIN().

A "surrounding expression" of expression EXPR is defined as the subset of EXPR excluding all subtrees rooted at the top level array constructors. For example, the surrounding expression at the top level of the example of Table A is "a(2:12:2)=d(1:16:3)+".

If the extent or number of elements of an array constructor or implied-do is expressed in terms of the variables defined before reaching the expression containing the array constructor or implied-do, this array constructor or implied-do has a "static" extent. Otherwise, this array constructor or implied-do has a "dynamic" extent.

Scalarizing an expression can be loosely interpreted as removing the array constructs in the expression and creating semantically equivalent scalar code, often with enclosing iterative statements.

Figure 1:
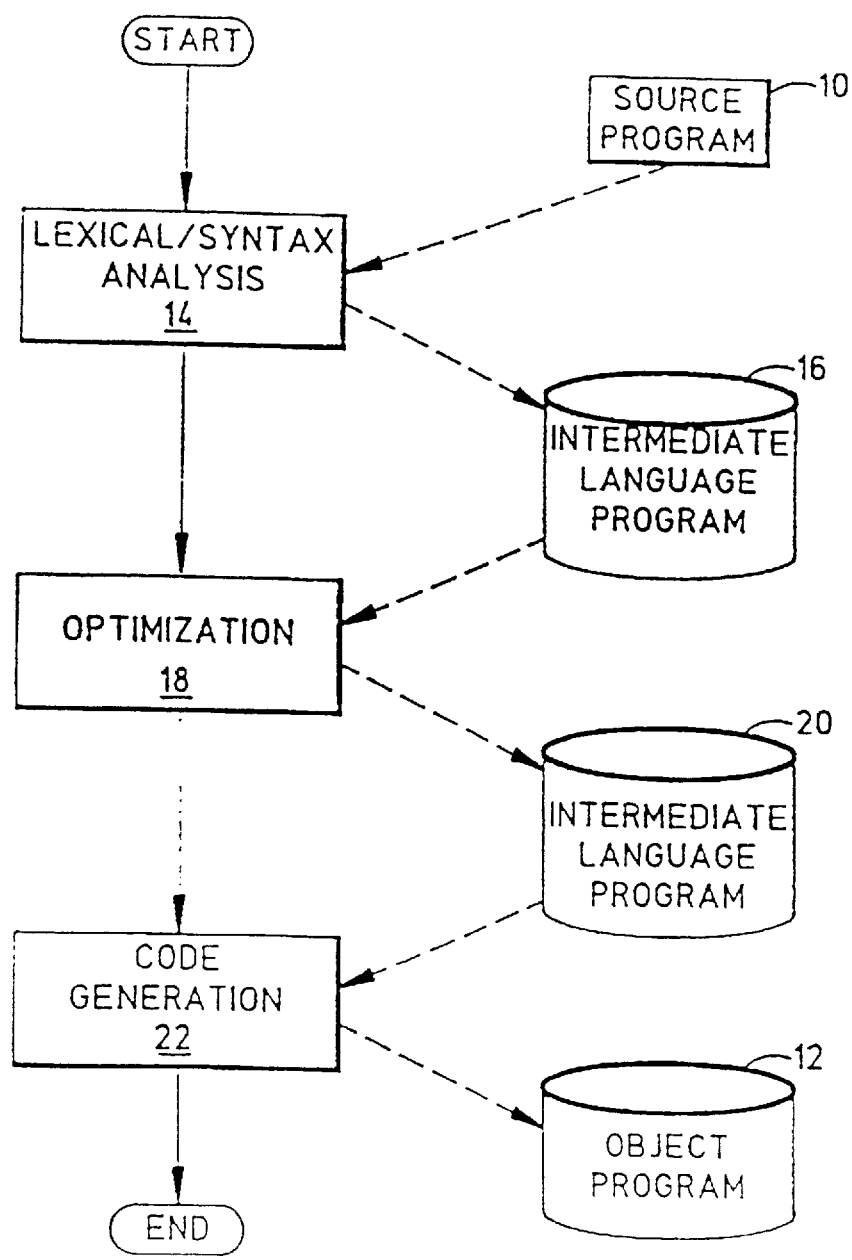
FIG. 1 shows a functional block diagram of an exemplary compiling method from the prior art.
Figure 2:
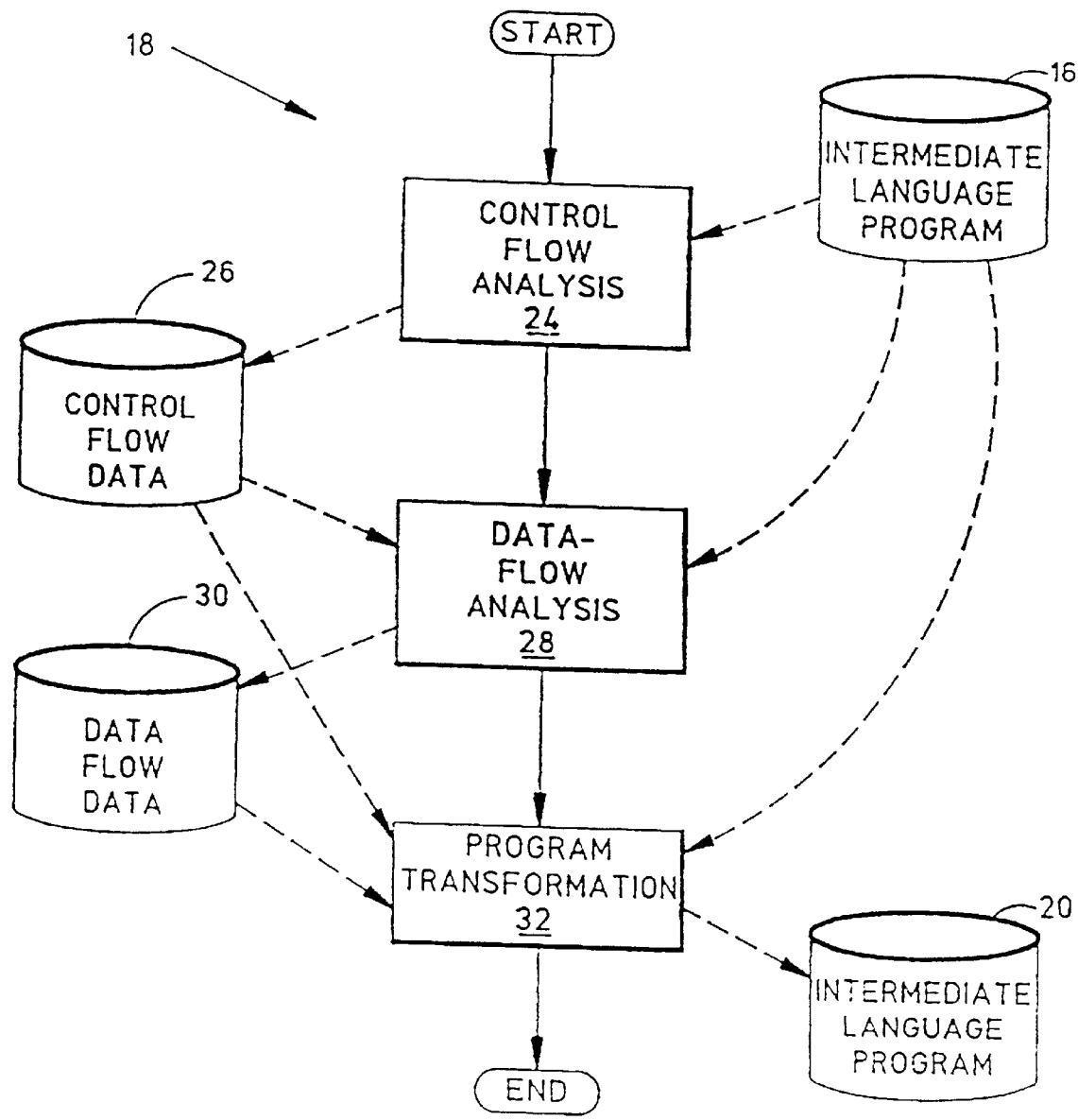
FIG. 2 shows a functional block diagram of an exemplary compiling optimization method from the prior art.
Figure 3:
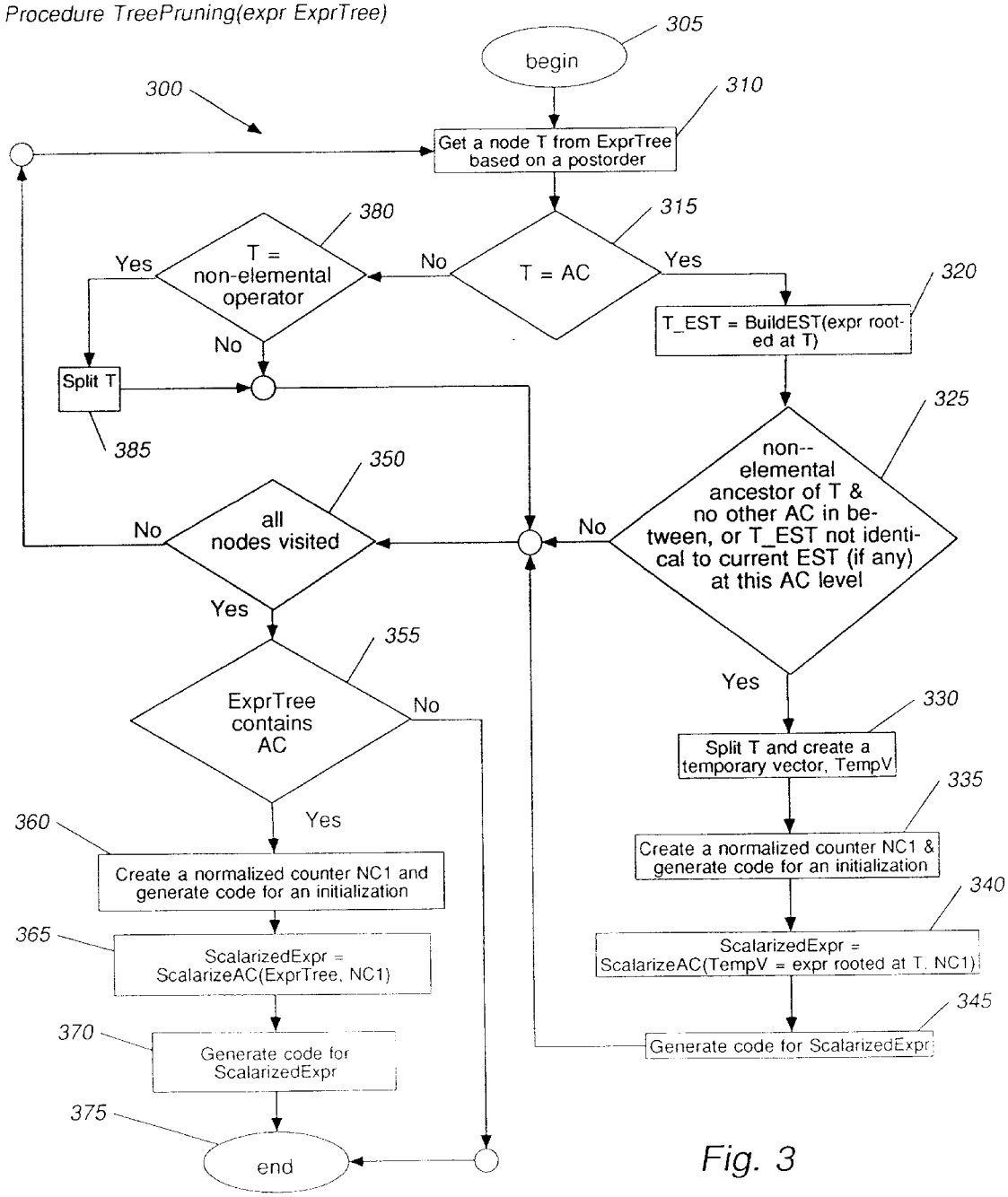
FIG. 3 is a flowchart illustrating the operations preferred in carrying out the Procedure TreePruning portion of the present invention.
Figure 4:
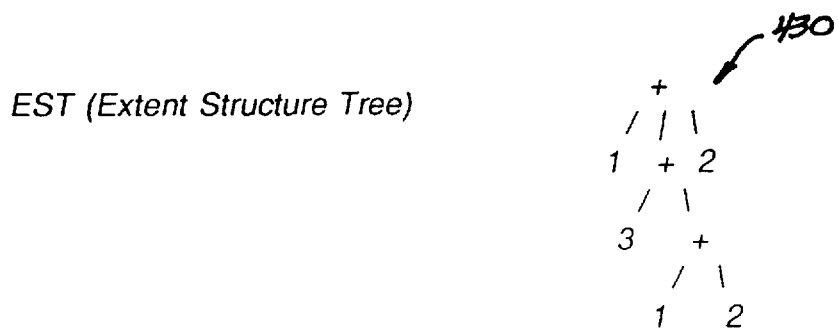
FIG. 4 illustrates an expression, its corresponding expression tree, and its corresponding extent structure tree in accordance with the present invention.

Three sets of pseudo code in Tables H, I, and J describe the new process. The TreePruning procedure of Table H, whose flowchart is illustrated in FIG. 3, splits the array constructors determined not to be inlined. During a post order walk of an expression tree, ExprTree of an expression, if the current node, T, is an array constructor, an Extent Structure Tree (ST) is built to represent the raw structure of the extent of T. FIG. 4 illustrates the expression 410 of the example of Table A, its corresponding expression tree 420, and the Extent Structure Tree 430 of the array constructor 440. If T is the closest array constructor descendent of a non-elemental operator or the EST of T is not identical to the existing EST at the current array constructor level, a temporary vector is created, and T is split from the expression, ExprTree. The evaluation of the EST of T can obtain the required size of the temporary.

If T is an non-elemental operator, it is also split from ExprTree, which is part of the general scalarization process. After the pruning process, if an expression still contains an array constructor, a normalized counter is created and ScalarizeAC() is invoked to scalarize the expression. Table J contains the pseudo code of ScalarizeAC() and its flowchart is illustrated in FIG. 6.

Figure 5:
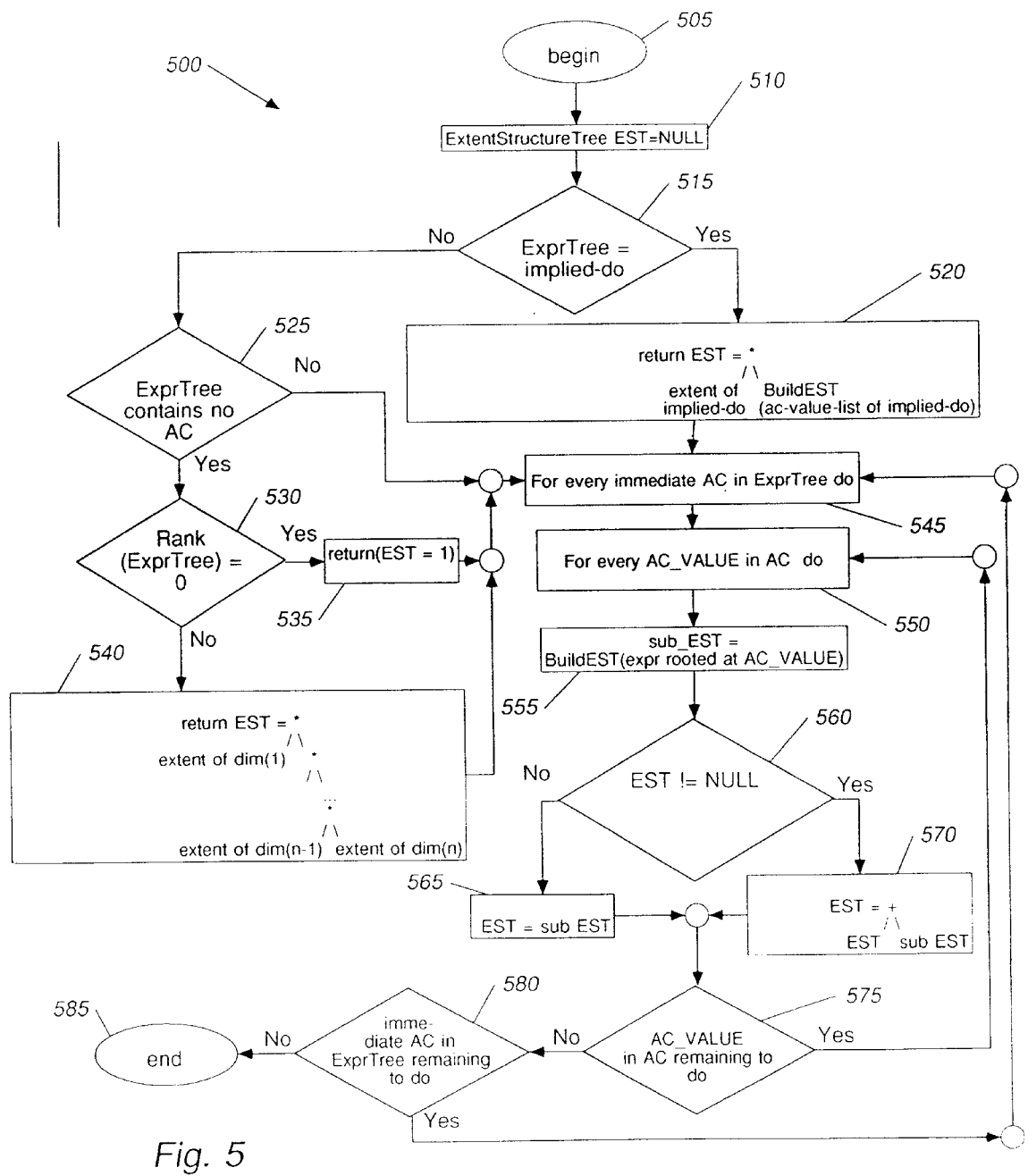
FIG. 5 is a flowchart illustrating the operations preferred in carrying out the Procedure BuildEST portion of the present invention.

Table I shows the BuildEST procedure, whose flowchart is illustrated in FIG. 5, which recursively constructs ESTs for a given expression. The EST of (/0.0,b(3:4)/) is:

TABLE F

```
    +
   / \
  1   2
```

This EST indicates that "0.0" has an extent of one, and that "b(3:4)" has an extent of two.

The ESTs of (/c(1),c(5:8:3)/) and (/0.0,b(3:4)/) are identical. But the ESTs of (/c(5:8:3),c(1)/) and (/0.0,b(3:4)/) are different. The EST of the former (/c(5:8:3),c(1)/) is:

TABLE G

```
    +
   / \
  2   1
```

This EST indicates that "c(5:8:3)" has an extent of two, and that "c(1)" has an extent of one.

Table J shows the pseudo code to of SclarizeAC, whose flowchart is illustrated in FIG. 6, which scalarizes an expression. A normalized counter at each level is used in scalarizing the surrounding expression at the current level. The normalized counter allows the correct array element references in the surrounding expression. It also maintains the correct references across different code segments generated for multiple ac-values. This counter is referred to as normalized because the increment of the counter is one. In ScalarizeAC(), the surrounding expression is scalarized using the passed normalized counter. A statement is generated to update the counter.

Next the ac-value in each array constructor at the top level is found to obtain the referenced elements. Although the AC_VALUE_SET from different array constructors may have different constructs, e.g. an implied-do and a vector, the ESTs of the referenced element segments are the same because of a prior checking. Therefore, the ac-values in AC_VALUE_SET may be treated as having the same type of constructs. If the AC_VALUE_SET is an implied-do, a loop is generated accordingly. ScalarizeAC() is invoked recursively to scalarize the ac-value-list. If AC_VALUE_SET contains an array constructor, a new normalized counter is created for the next array constructor level. The normalized counter is passed for a recursive invocation of ScalarizeAC. If AC_VALUE_SET is an array expression, a loop nest is created accordingly and the expression is scalarized using the loop index variables. A scalarized expression, ScalarizedExpr_SET, is attached to the surrounding expression at a proper node.

TABLE H

Pseudo Code to Prune a Parse Tree

TreePruning(expr ExprTree)
{
  Get a node T from ExprTree based on a post order until all nodes are visited {

TABLE H-continued

Pseudo Code to Prune a Parse Tree

```
if(T = AC) {
  T_EST = BuildEST(expr rooted at T);
  if(T has an ancestor of non-elemental operator and-no other AC in
     between, or T_EST not identical to the current EST (if any) at this
AC
  level) {
    Split T and create a temporary vector, TempV;
    Create a normalized counter NC1 and generate code for an
    initialization;
    ScalarizedExpr = ScalarizeAC(TempV = expr rooted at T, NC1);
    Generate code for ScalarizedExpr;
  } endif
}
else {
  if(T = non-elemental operator)
  Split T;
  } endif
} enddo
if(ExprTree contains AC)
  Create a normalized counter NC1 and generate code for an initialization;
  ScalarizeExpr = ScalarizeAC(ExprTree, NC1);
  Generate code for ScalarizedExpr;
}
```

TABLE I

Pseudo code to Construct an Extent Structure Tree

```
ExtentStructureTree BuildEST(expr ExprTree)
{
  ExtentStructureTree EST=NULL;
  if(ExprTree = implied-do) {
    return EST =   *
                  / \
    extent of implied-do    BuildEST(ac-value-list of implied-do)
  }
  else
  if(ExprTree contains no AC) {
    if(Rank(ExprTree) = 0)
      return(EST = 1);
    else /* Rank(ExprTree) = n>0 */
      return EST = *
                  / \
      extent of dim(1)   *
                        / \
                       :
                         *
                        / \
      extent of dim(n-1)   *extent ofdim(n)
    } endif
  } endif
  For every immediate AC in ExprTree do {
    For every AC_VALUE in AC do {
      sub_EST = BuildEST(expr rooted at AC_VALUE);
      if(EST != NULL)
        EST =  +
              / \
            EST  sub_EST
      else
        EST = sub_EST
      } endif
    } enddo
  } enddo
}
```

TABLE J

Pseudo Code to Scalarize Array Constructors

```
expr ScalarizeAC(expr ExprTree, NormCounter NCx)
{
  S_Expr = surrounding expr of ExprTree;
  Scalarize S_Expr using NCx as the index variable;
  Generate NCx = NCx + 1 to update the normalized counter;
  Find AC_VALUE_SET in all of ACs at top level of ExprTree to obtain
  current elements;
  if(AC_VALUE_SET = implied-do) {
    Create a loop with the bounds from the implied-do;
    ScalarizedExpr_SET = ScalarizeAC(ac-value-list's of
    AC_VALUE_SET, NCx);
  }
  else
  if(AC_VALUE_SET contains AC) {
    Create a normalized counter NCy and generate code for an initializa-
tion;
    ScalarizedExpr_SET = ScalarizeAC(AC_VALUE_SET, NCy);
  }
  else
  if(AC_VALUE_SET = scalar expr) {
    ScalarizedExpr_SET = AC_VALUE_SET;
  }
  else /* AC_VALUE_SET = array expr */ {
    Create a loop nest with depth equal to rank(AC_VALUE_SET) &
    bounds from extents of AC_VALUE_SET;
    ScalarizeExpr_SET = AC_VALUE_SET scalarized using the
    loop index variables;
  } endif
  Attach ScalarizedExpr_SET to S_Expr;
  return S_Expr;
}
```

Some additional enhancements may be performed to improve the run time performance. A Fortran DATA statement may be used to replace a split array constructor assigned to a temporary vector if possible. For example, Temp_Vect(1:3)=(/1,2,3/)

can be replaced by

DATA Temp_VEct /1,2,3/

Another improvement is to replace a normalized counter by a constant if the value can be determined at compile time. With the new process and the enhancement, the following code may be generated for the example of Table A.

TABLE K

```
a(2) = d(1) + 20.0
a(4) = d(4) + c(2) + 0.0
nc2 = 1
nc1 = 2
do j = 1,2
  nc1 = nc1+1
  nc2 = nc2+1
  a(2*nc1)=d(3*nc1-2)+c(3*nc2-1)+b(j+2)
enddo
do i = 2,3
  nc1 = nc1+1
  a(2*nc1) = d(3*nc1-2) + 10.0*i
enddo
```

The use of a normalized counter at each array constructor level eases the description. It is, however, often unnecessary to generate a normalized counter at every level, although induction variable substitution can eliminate some of these normalized counters. If the extents of all of the array constructors in the expression are static, only one normalized counter at the top level is required to be created and all of the other normalized counters can be represented in terms of the sole normalized counter. An additional normalized counter is required for an array constructor of a dynamic extent to keep track of the exact extent at run time.

The inventors conducted experiments designed to compare the performance of the compiling method of the present invention with the existing art. One such experiment compiled the following Fortran 90 program of Table L:

TABLE L

```
real a(80002),b(50000),c(50005),d(80002)
do k = 1,20
  a(1:80002) =
   d(1:80002)+(/20.0,c(1:50001)+(/0.0,b(1:50000)/),(10.0*i,i=1,30000)/)
enddo
end
```

The results of the measurements performed on an "IBM RISC SYSTEM/6000" model 580 are listed below in Table M ("IBM" and "RISC SYSTEM/6000" are registered trademarks of International Business Machines Corporation):

TABLE M

| Compiler used | Execution time (in user CPU seconds) |
| --- | --- |
| IBM XLF compiler with VAST-2 preprocessor | 0.32 |
| Compiler using present invention | 0.20 |

Referring now to FIG. 3, FIG. 5, and FIG. 6, flowcharts illustrating operations preferred in carrying out the present invention are shown. In the flowcharts, the graphical conventions of a diamond for a test or decision and a rectangle for a process or function are used. These conventions are well understood by those skilled in the art, and the flowcharts are sufficient to enable one of ordinary skill to write code in any suitable computer programming language.

The operations preferred in carrying out the present invention may be implemented as three routines or programs comprising a Procedure TreePruning, a Procedure BuildEST, and a Procedure ScalarizeAC. The Procedure TreePruning, illustrated in FIG. 3, splits an array constructor determined not to be inlined. The Procedure BuildEST, illustrated in FIG. 5, builds an Extent Structure Tree (EST) representing the structure of the extent of an array constructor. The Procedure ScalarizeAC, illustrated in FIG. 6, scalarizes an array constructor.

Referring now to FIG. 3, which illustrates the operations preferred in carrying out the TreePruning Procedure 300 portion of the present invention, the process begins at process block 305. Thereafter, process block 310 gets a current node T from an ExprTree based on a postorder. Thereafter, decision block 315 determines if T is an array constructor. If T is an array constructor, then process block 320 sets T_EST=BuildEST(expr rooted at T). Thereafter, decision block 325 determines if T has an ancestor of non-elemental operator and no other AC in between, or if T_EST not identical to the current EST (if any) at this AC level). If this is true, then process block 330 splits T and creates a temporary vector, TempV. Thereafter, process block 335 creates a normalized counter NC1 and generates code for an initialization. Thereafter, process block 340 scalarizes TempV into ScalarizedExpr by calling ScalarizeAC(TempV=expr rooted at T, NC1). Thereafter, process block 345 generates code for ScalarizedExpr, the scalarized result returned by ScalarizeAC. Thereafter, decision block 350 determines if all nodes have been visited. If all nodes have been visited, then decision block 355 determines if ExprTree contains AC. If ExprTree contains AC, then process block 360 creates a normalized counter NC1 and generates code for an initialization. Thereafter, process block 365 scalarizes ExprTree into ScalarizedExpr by calling ScalarizeAC(ExprTree, NC1). Thereafter, process block 370 generates code for ScalarizedExpr. Thereafter, the process ends at process block 375.

Returning now to decision block 355, if ExprTree does not contain AC, then the process ends at process block 375.

Returning now to decision block 325, if T does not have an ancestor of non-elemental operator or there is another AC in between, and if T_EST is identical to the current EST (if any) at this AC level, then processing continues to decision block 350 to determine if all nodes have been visited.

Returning now to decision block 350, if all nodes have not been visited, then processing continues to process block 310 to get another node T based on the postorder.

Returning now to decision block 315, if T not equal to AC, then decision block 380 determines if T is a non-elemental operator. If T is a non-elemental operator, then process block 385 splits T. Thereafter, processing continues to decision block 350 to determine if all nodes have been visited.

Returning now to decision block 380, if T is not a non-elemental operator, then processing continues to decision block 350 to determine if all nodes have been visited.

Referring now to FIG. 5, which illustrates the operations preferred in carrying out the BuildEST Procedure 500 portion of the present invention, the process begins at process block 505. Thereafter, process block 510 sets ExtentStructureTree EST equal to NULL. Thereafter, decision block 515 determines if ExprTree is an implied-do. If ExprTree is an implied-do, then process block 520 returns EST equal to the extent of implied-do and an extent structure tree based on the ac-value-list of the implied-do produced by a call to BuildEST. Thereafter, process block 545 begins a loop for every immediate AC in ExprTree. Thereafter, process block 550 begins a loop for every AC_VALUE in AC. Thereafter, process block 555 sets sub_EST equal to an extent structure tree based on an expr rooted at AC_VALUE produced by a call to BuildEST. Thereafter, decision block 560 determines if EST is equal to NULL. If EST is equal to NULL, then process block 570 sets EST equal to the extent of EST and sub_EST. Thereafter, decision block 575 determines if there is an AC_VALUE in AC remaining to do. If there is an AC_VALUE in AC remaining to do, then processing loops back to process block 550 to process the next AC_VALUE in AC.

Returning now to decision block 575, if there is not an AC_VALUE in AC remaining to do, then decision block 580 determines if there is an immediate AC in ExprTree remaining to do. If there is an immediate AC in ExprTree remaining to do, then processing loops back to process block 545 to process the next immediate AC in ExprTree.

Returning now to decision block 580, if there is not an immediate AC in ExprTree remaining to do, then the process ends at process block 585.

Returning now to decision block 560, if EST is not equal to NULL, then process block 565 sets EST equal to sub_EST. Thereafter, processing continues to decision block 575 to determine if there is an AC_VALUE in AC remaining to do.

Returning now to decision block 515, if ExprTree is not an implied-do, then decision block 525 determines if ExprTree contains no AC. If ExprTree contains no AC, then decision block 530 determines if the Rank(ExprTree) is equal to zero. If the Rank(ExprTree) is equal to zero, then process block 535 returns EST equal to one. Thereafter, processing continues to the loop for processing every immediate AC in ExprTree starting at process block 545.

Returning now to decision block 530, if the Rank (ExprTree) is not equal to zero, i.e., the Rank(ExprTree) is equal to n greater than zero, then process block 540 returns EST equal to a recursively defined extent structure tree comprising the extent of dim(1) through dim(n). Thereafter, processing continues to the loop for processing every immediate AC in ExprTree starting at process block 545.

Returning now to decision block 525, if ExprTree contains an AC, then processing continues to the loop for processing every immediate AC in ExprTree starting at process block 545.

Referring now to FIG. 6, which illustrates the operations preferred in carrying out the ScalarizeAC Procedure 600 portion of the present invention, the process begins at process block 605. Thereafter, process block 610 sets S_Expr equal to the surrounding expr of ExprTree. Thereafter, process block 615 scalarizes S_Expr using NCx as the index variable. Thereafter, process block 620 generates NCx equal to NCx+1 to update the normalized counter. Thereafter, process block 625 finds AC_VALUE_SET in all of ACs at top level of ExprTree to obtain current elements. Thereafter, decision block 630 determines if AC_VALUE_SET is an implied-do. If AC_VALUE_SET is an implied-do, then process block 635 creates a loop with the bounds from the implied-do. Thereafter, process block 640 scalarizes the implied do by calling ScalarizeAC(ac-value-list's of AC_VALUE_SET, NCx) and setting ScalarizedExpr_SET equal to the returned results. Thereafter, process block 650 attaches ScalarizedExpr_SET to S_Expr. Thereafter, process block 655 returns S_Expr as a result to the calling Procedure TreePruning, and the process ends at process block 660.

Returning now to decision block 630, if AC_VALUE_SET is not an implied-do, then decision block 665 determines if AC_VALUE_SET contains an AC. If AC_VALUE_SET contains an AC, then process block 670 creates a normalized counter NCy and generates code for an initialization. Thereafter, process block 675 scalarizes the AC_VALUE_SET by calling ScalarizeAC(AC_VALUE_SET, NCy) and setting ScalarizedExpr_SET equal to the returned results. Thereafter, processing continues to process block 650 for attachment of ScalarizedExpr_SET to S_Expr.

Returning now to decision block 665, if AC_VALUE_SET does not contain an AC, then decision block 680 determines if AC_VALUE_SET is a scalar expression. If AC_VALUE_SET is a scalar expression, then process block 685 scalarizes the AC_VALUE_SET by calling ScalarizeAC(AC_VALUE_SET) and setting ScalarizedExpr_SET equal to the returned results. Thereafter, processing continues to process block 650 for attachment of ScalarizedExpr_SET to S_Expr.

Returning now to decision block 680, if AC_VALUE_SET is not a scalar expression, i.e., if AC_VALUE_SET is an array expression, then process block 690 creates a loop nest with depth equal to rank(AC_VALUE_SET) and bounds from extents of AC_VALUE_SET. Thereafter, process block 695 scalarizes the AC_VALUE_SET by using the loop index variables. Thereafter, processing continues to process block 650 for attachment of ScalarizedExpr_SET to S_Expr.

Referring now to FIG. 7, a block diagram illustrates a computer system 700 used in performing the method of the present invention, forming part of the apparatus of the present invention, and which may use the article of manufacture comprising a computer-readable storage medium having a computer program embodied in said medium which may cause the computer system to practice the present invention. The computer system 700 includes a processor 702, which includes a central processing unit (CPU) 704, and a memory 706. Additional memory, in the form of a hard disk file storage 708 and a computer-readable storage device 710, is connected to the processor 702. Computer-readable storage device 710 receives a computer-readable storage medium 712 having a computer program embodied in said medium which may cause the computer system to implement the present invention in the computer system 700. The computer system 700 includes user interface hardware, including a mouse 714 and a keyboard 716 for allowing user input to the processor 702 and a display 718 for presenting visual data to the user. The computer system may also include a printer 720.

Although the present invention has been particularly shown and described with reference to a preferred embodiment, it will be understood by those skilled in the art that various changes in form and detail may be made without departing from the spirit and the scope of the invention.

We claim:

1. A method for translating an expression containing one or more array constructors nested in one or more array constructor levels in a source program, said method comprising the steps of:
   searching a plurality of nodes of an expression tree of the expression for each of the array constructors;
   associating a normalized counter with each of the array constructor levels;
   scalarizing the array constructors nested in an array constructor level by use of the normalized counter associated with the array constructor level;
   building an extent structure tree of a portion of the expression tree rooted at a current expression tree node if the current expression tree node is an array constructor; and
   splitting the current expression tree node if the current expression tree node is a non-elemental operator.

2. The method of claim 1 wherein the building step further comprises the steps of:
   determining if the current expression tree node has a non-elemental operator ancestor and no other array constructor in between, or if the extent structure tree rooted at the current expression tree node is not identical to a prior extent structure tree built at the array constructor level of the current expression tree node; and
   splitting the current expression tree node, associating the normalized counter with the array constructor, and scalarizing the portion of the expression tree rooted at the current expression tree node using the associated normalized counter, if the determination is true.

3. The method of claim 2 wherein the scalarizing step further comprises the steps of:
   scalarizing a surrounding expression of the current expression node using the associated normalized counter as an index variable;
   incrementing the associated normalized counter;
   scalarizing the portion of the expression tree rooted at a current expression tree node using an ac-value of an array constructor located at a top level of the expression tree; and
   attaching the scalarized portion to the scalarized surrounding expression.

4. The method of claim 3 wherein the scalarizing portion step further comprises the steps of:
   if the ac-value is an implied-do, creating a loop with bounds from the implied-do and scalarizing the ac-value;
   if the ac-value contains an array constructor, creating another normalized counter and scalarizing the ac-value;
   scalarizing the ac-value if the ac-value is a scalar expression; and
   creating a loop nest with depth equal to a rank of the ac-value and with bounds from extents of the ac-value, and scalarizing the ac-value using loop index variables based on the depth and the bounds, if the ac-value is an array expression.

5. A computer system for translating an expression containing one or more array constructors nested in one or more array constructor levels in a source program, said computer system comprising:
   a searcher for searching a plurality of nodes of an expression tree of the expression for each of the array constructors;
   an associator for associating a normalized counter with each of the array constructor levels;
   a scalarizer for scalarizing the array constructors nested in an array constructor level by use of the normalized counter associated with the array constructor level;
   an extent structure tree builder for building an extent structure tree of a portion of the expression tree rooted at a current expression tree node if the current expression tree node is an array constructor; and
   a splitter for splitting the current expression tree node if the current expression tree node is a non-elemental operator.

6. The computer system of claim 5 wherein the building means further comprises:
   a comparator for determining if the current expression tree node has a non-elemental operator ancestor and no other array constructor in between, or if the extent structure tree rooted at the current expression tree node is not identical to a prior extent structure tree built at the array constructor level of the current expression tree node; and
   an expression splitter for splitting the current expression tree node, an associator for associating the normalized counter with the array constructor, and a scalarizer for scalarizing the portion of the expression tree rooted at the current expression tree node using the associated normalized counter, if the determination is true.

7. The computer system of claim 6 wherein the scalarizer further comprises:
   a scalarizer for scalarizing a surrounding expression of the current expression node using the associated normalized counter as an index variable;
   an incrementer for incrementing the associated normalized counter;
   a scalarizer for scalarizing the portion of the expression tree rooted at a current expression tree node using an ac-value of an array constructor located at a top level of the expression tree; and
   an associator for attaching the scalarized portion to the scalarized surrounding expression.

8. The computer system of claim 7 wherein the scalarizer for scalarizing the portion further comprises:

a loop scalarizer for creating a loop with bounds from the implied-do and scalarizing the ac-value if the ac-value is an implied-do;

a counter creator for creating another normalized counter and a scalarizer for scalarizing the ac-value if the ac-value contains an array constructor;

a scalarizer for scalarizing the ac-value if the ac-value is a scalar expression; and a loop scalarizer for creating a loop nest with depth equal to a rank of the ac-value and with bounds from extents of the ac-value, and scalarizing the ac-value using loop index variables based on the depth and the bounds, if the ac-value is an array expression.

9. An article of manufacture for use in a computer system for translating an expression containing one or more array constructors nested in one or more array constructor levels in a source program, said article of manufacture comprising a computer-readable storage medium having a computer program embodied in said medium which may cause the computer system to:

search a plurality of nodes of an expression tree of the expression for each of the array constructors;

associate a normalized counter with each of the array constructor levels;

scalarize the array constructors nested in an array constructor level by use of the normalized counter associated with the array constructor level;

build an extent structure tree of a portion of the expression tree rooted at a current expression tree node if the current expression tree node is an array constructor; and split the current expression tree node if the current expression tree node is a non-elemental operator.

10. The article of manufacture of claim 9, wherein said computer program, in causing the computer system to build the extent structure tree of the portion of the expression tree, may further cause the computer system to:

determine if the current expression tree node has a non-elemental operator ancestor and no other array constructor in between, or if the extent structure tree rooted at the current expression tree node is not identical to a prior extent structure tree built at the array constructor level of the current expression tree node; and split the current expression tree node, associating the normalized counter with the array constructor, and scalarize the portion of the expression tree rooted at the current expression tree node using the associated normalized counter, if the determination is true.

11. The article of manufacture of claim 10, wherein said computer program in causing the computer system to scalarize the portion of the expression tree rooted at the current expression tree node, may further cause the computer system to:

scalarize a surrounding expression of the current expression node using the associated normalized counter as an index variable;

increment the associated normalized counter;

scalarize the portion of the expression tree rooted at a current expression tree node using an ac-value of an array constructor located at a top level of the expression tree; and attach the scalarized portion to the scalarized surrounding expression.

12. The article of manufacture of claim 11, wherein said computer program in causing the computer system to scalarize the portion of the expression tree rooted at the current expression tree node, may further cause the computer system to:

if the ac-value is an implied-do, create a loop with bounds from the implied-do and scalarize the ac-value;

if the ac-value contains an array constructor, create another normalized counter and scalarize the ac-value;

scalarize the ac-value if the ac-value is a scalar expression; and create a loop nest with depth equal to a rank of the ac-value and with bounds from extents of the ac-value, and scalarize the ac-value using loop index variables based on the depth and the bounds, if the ac-value is an array expression.

* * * * *